(12) United States Patent
Fung et al.

(10) Patent No.: US 9,402,506 B2
(45) Date of Patent: Aug. 2, 2016

(54) SLIDING DRIP ASSEMBLY FOR A COOKING APPLIANCE

(71) Applicant: CONAIR CORPORATION, Stamford, CT (US)

(72) Inventors: Kam Fai Fung, Hong Kong (CN); Kin Man Lai, Hong Kong (CN)

(73) Assignee: CONAIR CORPORATION, Stamford, CT (US)

( * ) Notice: Subject to any disclaimer, the term of this patent is extended or adjusted under 35 U.S.C. 154(b) by 270 days.

(21) Appl. No.: 13/957,783

(22) Filed: Aug. 2, 2013

(65) Prior Publication Data

US 2015/0033528 A1 Feb. 5, 2015

(51) Int. Cl.
*A47J 37/06* (2006.01)

(52) U.S. Cl.
CPC ........ *A47J 37/0611* (2013.01); *Y10T 29/49716* (2015.01)

(58) Field of Classification Search
CPC .................................................. A47J 37/0611
USPC ............................. 99/446, 445, 444, 400, 375
See application file for complete search history.

(56) References Cited

U.S. PATENT DOCUMENTS

| | | | |
|---|---|---|---|
| 2,033,060 A | 3/1936 | Anderson | |
| 2,057,501 A | 10/1936 | Parr | |
| 2,607,287 A | 8/1952 | Price | |
| 2,691,369 A * | 10/1954 | Rutenber | 126/332 |
| 2,719,903 A | 10/1955 | Oertli | |
| 3,450,025 A * | 6/1969 | Fleming | 99/399 |
| 4,036,995 A | 7/1977 | Koether et al. | |
| 4,088,067 A | 5/1978 | Kaebitzsch et al. | |
| 4,206,345 A | 6/1980 | Maass et al. | |
| 4,697,504 A | 10/1987 | Keating | |
| 5,237,914 A | 8/1993 | Carstensen | |
| 5,467,696 A | 11/1995 | Everhart | |
| 5,531,155 A | 7/1996 | Pellicane et al. | |
| 5,712,466 A | 1/1998 | Spicer | |
| 5,758,568 A | 6/1998 | Moravec | |
| 5,848,567 A | 12/1998 | Chiang | |
| 5,992,302 A | 11/1999 | Geisler | |
| 6,062,130 A | 5/2000 | Brady | |
| D436,498 S | 1/2001 | Carlson et al. | |
| 6,389,959 B1 | 5/2002 | Robertson | |
| 6,433,312 B1 * | 8/2002 | Chen | 219/386 |
| 6,439,108 B1 | 8/2002 | Wu | |
| RE37,988 E | 2/2003 | Uss | |
| 6,539,842 B1 | 4/2003 | Chapman et al. | |
| 6,591,740 B1 | 7/2003 | Hsu | |
| 6,595,116 B1 | 7/2003 | Lin | |
| 6,705,306 B1 | 3/2004 | Dickey | |
| 7,514,655 B2 | 4/2009 | Fernandez et al. | |
| 7,608,803 B2 | 10/2009 | Jerovsek | |
| 7,717,028 B2 | 5/2010 | Serra | |
| 8,122,816 B2 | 2/2012 | Yu | |
| 8,261,657 B2 | 9/2012 | Serra et al. | |
| 8,621,986 B2 * | 1/2014 | Serra et al. | 99/333 |
| 2004/0074398 A1 | 4/2004 | Griffin et al. | |
| 2005/0139086 A1 | 6/2005 | McHutchison | |
| 2009/0165774 A1 | 7/2009 | Johnston et al. | |
| 2012/0090476 A1* | 4/2012 | Wang et al. | 99/379 |
| 2012/0137897 A1 | 6/2012 | Tahincioglu | |

* cited by examiner

*Primary Examiner* — Reginald L Alexander
(74) *Attorney, Agent, or Firm* — Grogan, Tuccillo & Vanderleeden, LLP

(57) ABSTRACT

A cooking appliance includes an upper housing having a first heating plate and a lower housing having a second heating plate. A handle is connected to the upper housing and is operable to move the upper housing between an open position and a closed position. The cooking appliance further includes a drip tray that is slidably received in said lower housing.

13 Claims, 4 Drawing Sheets

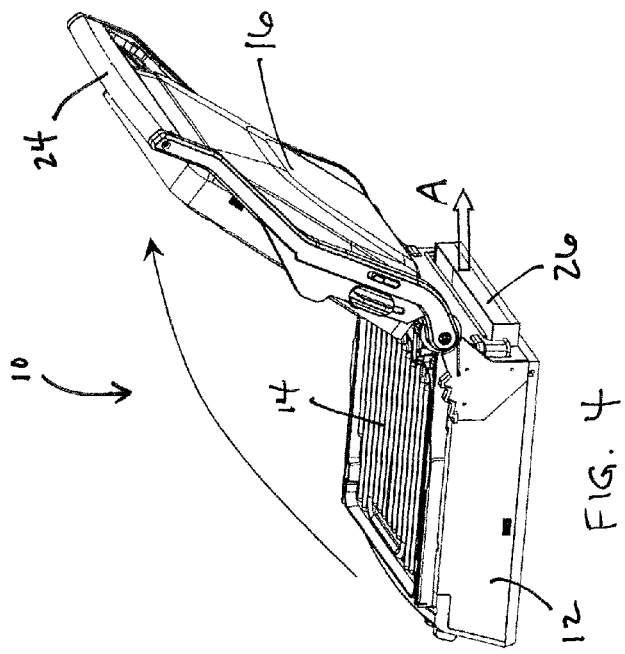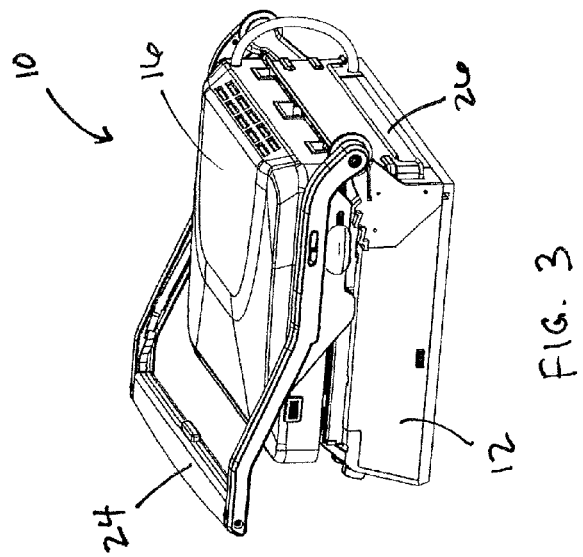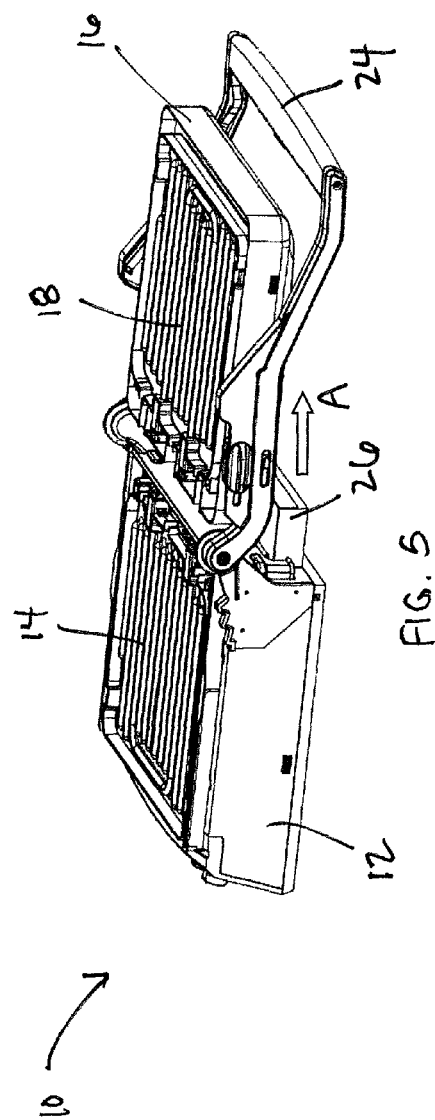

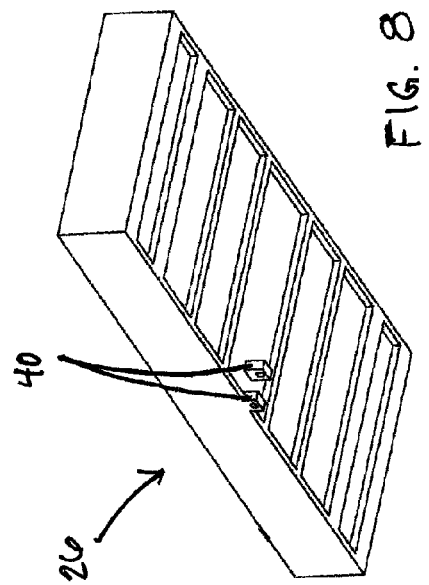
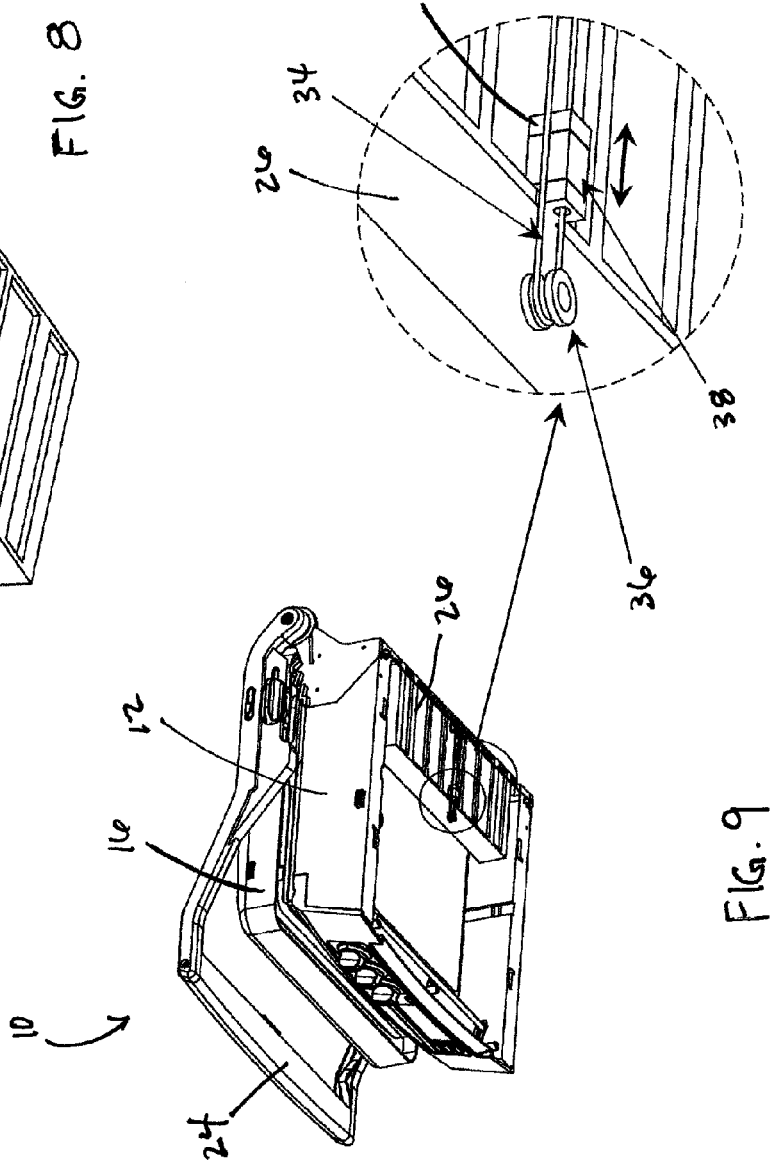

SLIDING DRIP ASSEMBLY FOR A COOKING APPLIANCE

FIELD OF THE INVENTION

The present invention relates to cooking appliances and, more particularly, to a siding drip tray assembly for a cooking appliance.

BACKGROUND OF THE INVENTION

Cooking appliances, and in particular electric grilling devices such as griddles, are known. These grilling/griddle devices typically have a lower housing having a lower cooking surface and an upper housing having an upper cooking surface, wherein the cooking surfaces are typically heated by an electrical resistance heater. A handle attached to the upper housing allows a user to raise and lower the upper housing relative to the lower housing to accommodate a food item therebetween to be heated.

While existing grilling devices are generally suitable for what is regarded as ordinary performance, there is room for improvement in terms of cleanliness and convenience. As will be readily appreciated, while existing grills may include a drip tray that is manually positionable to collect drippings or run off of cooking juices from the front of the lower cooking surface, drippings from the upper grill surface can create an undesirable mess. In particular, especially when in the partially open position or fully open position, the run off of cooking juices from the rear edge of the upper cooking surface typically is not collected and instead finds its way to a countertop or other surface on which the grill is placed.

SUMMARY OF THE INVENTION

It is an object of the present invention to provide a cooking appliance having a sliding drip tray assembly.

It is another object of the present invention to provide a cooking appliance having a sliding drip tray assembly that collects the run off of cooking juices.

It is another object of the present invention to provide a cooking appliance having a sliding drip tray assembly that automatically extends from a lower housing of the cooking appliance when the cooking appliance is in an open position.

It is another object of the present invention to provide a cooking appliance having a sliding drip tray assembly that automatically retracts into the lower housing when the cooking appliance is closed.

These and other objects are achieved by the present invention.

According to an embodiment of the present invention, a cooking appliance includes an upper housing having a first heating plate and a lower housing having a second heating plate. A handle is connected to the upper housing and the lower housing and is operable to selectively move the upper housing in relation to the lower housing. The grill further includes a drip tray that is slidably received in said lower housing.

In another embodiment, a method for catching run off of cooking juices from a cooking appliance having an upper housing having an upper cooking plate and a lower housing having a lower cooking plate is provided. The method includes the steps of raising the upper housing to an open position and extending a drip tray from the lower housing to a position beneath a rear edge of the upper cooking plate.

According to yet another embodiment of the present invention, a cooking appliance is provided. The cooking appliance includes an upper housing, a lower housing and a handle connected to the upper housing and movable between a lowered position and a raised position. The cooking appliance further includes a drip tray slidably received in the lower housing. The drip tray is configured to automatically extend from the lower housing when the handle is moved from the lowered position to the raised position.

BRIEF DESCRIPTION OF THE DRAWINGS

The present invention will be better understood from reading the following description of non-limiting embodiments, with reference to the attached drawings, wherein below:

FIG. 3 is a perspective side view of the cooking appliance of FIG. 1, shown in a closed position.

FIG. 4 is a perspective side view of the cooking appliance of FIG. 1, shown in a partially open position and illustrating the extension of an auto-slide drip tray in accordance with an embodiment of the present invention.

FIG. 5 is a perspective side view of the cooking appliance of FIG. 1, shown in a fully open position and illustrating the extension of an auto-slide drip tray in accordance with an embodiment of the present invention.

FIG. 8 is a perspective view of the auto-slide drip tray in accordance with an embodiment of the present invention.

FIG. 9 is a perspective bottom view of the cooking appliance of FIG. 1, illustrating the position of the auto-slide drip tray.

DETAILED DESCRIPTION OF THE PREFERRED EMBODIMENTS

Figure 1:
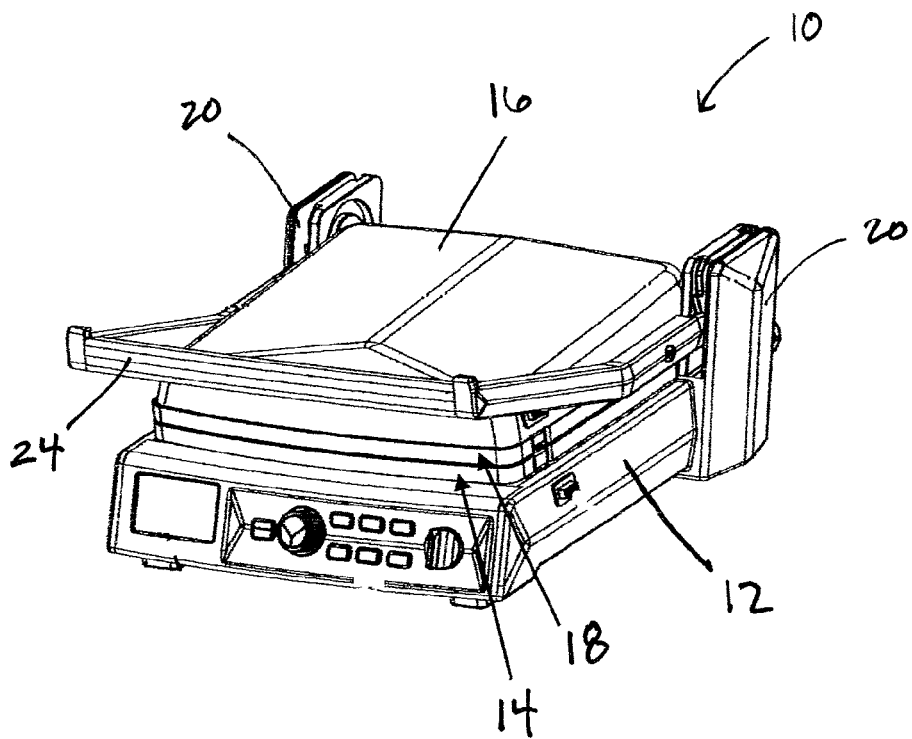
FIG. 1 is a perspective front view of a cooking appliance in accordance with an embodiment of the present invention.
Figure 2:
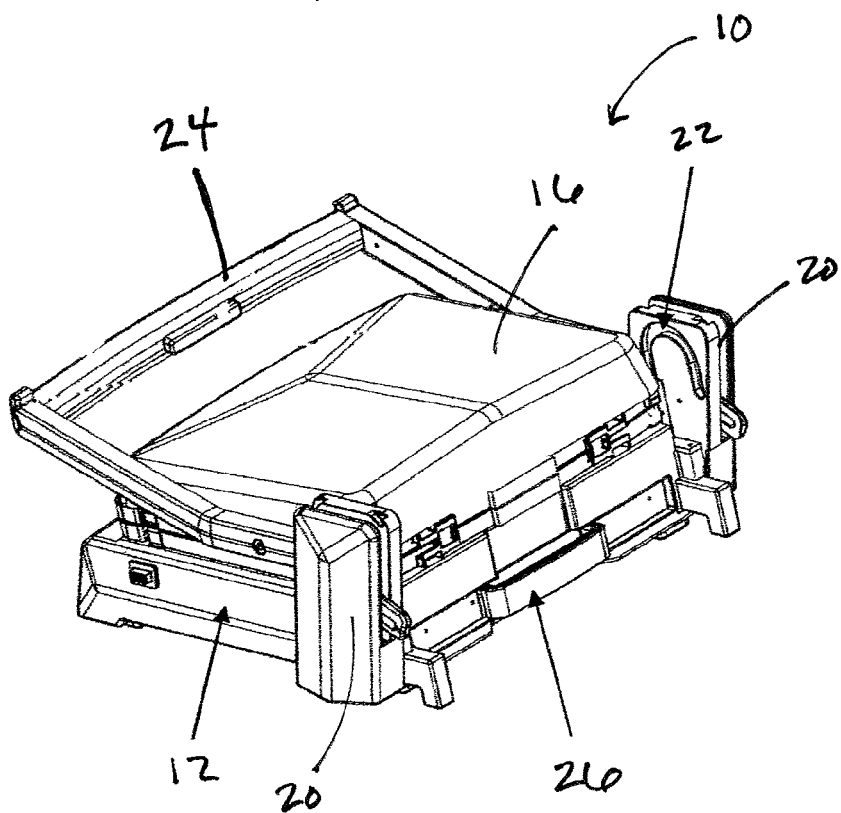
FIG. 2 is a perspective rear view of the cooking appliance of FIG. 1.

Referring to FIGS. 1-5, a cooking appliance 10 according to an embodiment of the present invention is shown. As shown therein, the cooking appliance 10 generally takes the form of a countertop grill and includes a lower housing 12 having a lower cooking plate 14 and an upper housing 16 having an upper cooking plate 18. The upper housing 16 is operatively connected to the lower housing 12 via opposed frame members 20 extending from the lower housing 16. In particular, as shown therein, the upper housing 16 rides in a guide track 22 in the frame members 20. A handle 24 attached to the upper housing 16 allows a user to raise and lower the upper housing in the guide track in order to selectively position the grill 10 in a closed position, as shown in FIG. 3, a partially open position, as shown in FIG. 4, and a fully open position, as shown in FIG. 5.

As best shown in FIG. 5, the cooking plates 14, 18 have sidewalls that function to retain the run off of cooking juices when in a generally horizontal position (i.e., when in the closed/cooking position shown in FIG. 3 or the fully open position shown in FIG. 5).

With particular reference to FIGS. 3, 4 and 5, the grill 10 also includes a drip tray 26 slidably received in a rear of the lower housing 12. As shown therein, the drip tray 26 is configured to automatically extend from the lower housing 12, in the direction of arrow A, when the handle 24 is raised so as to catch any run off of cooking juices from the upper cooking plate 18. Similarly, the drip tray 26 is configured to retract into the lower housing 12 when the handle 24 is lowered. Importantly, the drip tray 26 is configured to automatically extend from the lower housing 12 to catch the run off of cooking juices when the grill is in the partially open position, as shown in FIG. 4.

Figure 6:
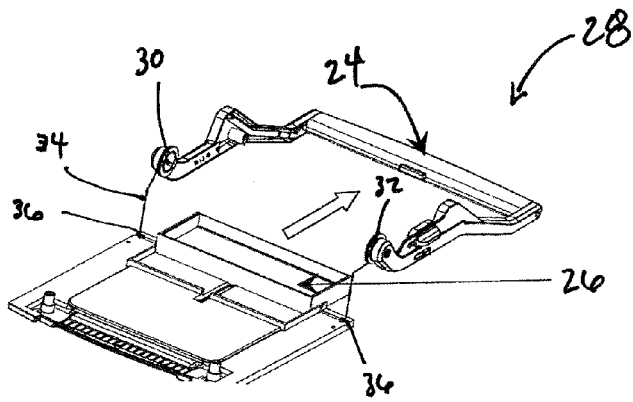
FIG. 6 is a perspective view of a pulley mechanism of the auto-slide drip tray.
Figure 7:
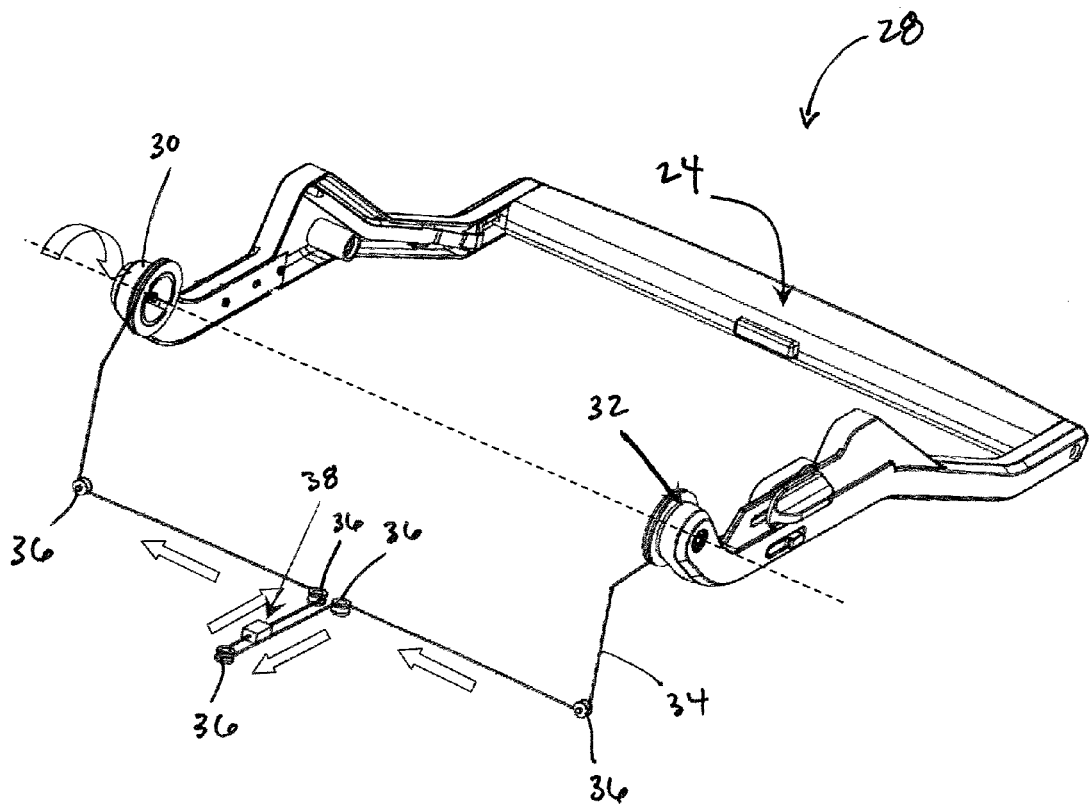
FIG. 7 is an enlarged view of the pulley mechanism of FIG. 6.

The drip tray 26 is automatically extendable and retractable from the lower housing 12 upon raising and lowering of the handle 24, respectively, via a pulley mechanism 28. As shown in FIGS. 6 and 7, the pulley mechanism 28 includes pulleys 30, 32 at opposed distal ends of the handle 24. A wire 34 extends from one of the pulleys 30, 32, past a series of smaller pulleys 36, and to the other of the pulleys 30, 32. The distal ends of the wire 34 are releasably secured to each of the pulleys 30, 32 to effect extension and retraction of the drop tray 26, as discussed hereinafter. At an approximate midpoint along the length of the wire 34, a generally rectangular slide 38 is fixedly secured to the wire 34.

With reference to FIG. 8, the drip tray 26 is generally rectangular in shape and includes a pair of tabs 40 having an aperture therethrough formed on the bottom of the drip tray 26. As best shown in the enlarged illustration of FIG. 9, the slide 38 is retained between the tabs 40 and the wire 34 is provided through the apertures in the tabs 40, which integrates the drip tray 26 with the pulley mechanism 28.

In operation, as the handle 24 is lifted from the closed position of FIG. 3 towards the intermediate/partially open position of FIG. 4, the pulley 32 releases the wire 34 such that it may be unrolled therefrom, while pulley 30 rolls the wire up. As shown in FIG. 7, this causes movement of the wire in the direction of the arrows, and causes the slide 38 to move therewith. As the slide 38 is fixed between the tabs 40 on the bottom of the drip tray 26, the drip tray 26 moves with the slide 38. As such, as the handle 24 is lifted, the movement of wire 34, and the slide 38 pushes the drip tray 26 out of the lower housing 12 to its extended position, where it serves to catch run off of cooking juices from the upper cooking plate 18.

Conversely, when the handle 24 is lowered towards the closed position of FIG. 3, pulley 30 releases the wire 34 such that it may be unrolled therefrom, while pulley 32 rolls the wire up. As will be readily appreciated, this causes the wire 34, and thus the slide 38, to travel in the opposite direction, thereby pulling the drip tray 26 into the lower housing 12.

As disclosed above, the drip tray 26 is automatically extendable from the lower housing 12 when the grill 10 is opened, thereby obviating the need for a user to clean the countertop after use or to manually position a drip tray to catch cooking juice run off. Likewise, the drip tray 26 automatically retracts into the lower housing 12 when the grill is closed, for compact storage. Accordingly, the grill of the present invention provides a degree of convenience and cleanliness heretofore not seen in the art.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A cooking appliance, comprising:
    an upper housing having a first heating plate;
    a lower housing having a second heating plate;
    a handle connected to said upper housing and said lower housing, said handle being operable to selectively move said upper housing in relation to said lower housing; and
    a moving mechanism in operative communication with said handle, said moving mechanism translating a raising and lowering movement of said handle into a sliding movement of a drip tray slidably received in said lower housing.

2. The cooking appliance of claim 1, wherein:
    said drip tray is selectively movable between an extended position, in which said drip tray is extended from said housing and positioned beneath a rear edge of said first heating plate, and a retracted position, in which said drip tray is fully received in said lower housing.

3. The cooking appliance of claim 1, wherein:
    said moving mechanism is a pulley mechanism operatively connected to said drip tray and said handle.

4. The cooking appliance of claim 3, wherein:
    said pulley mechanism includes a pair of pulleys on opposed distal ends of said handle, a wire extending between said pulleys, and a slide affixed to said wire at an approximate midpoint of said wire.

5. The cooking appliance of claim 4, wherein:
    said slide engages said drip tray on a bottom thereof.

6. The cooking appliance of claim 4, wherein:
    said pair of pulleys is a first pulley and a second pulley;
    wherein said first pulley is configured to release said wire and said second pulley is configured to wind said wire about said second pulley upon said raising of said handle; and
    said second pulley is configured to release said wire and said first pulley is configured to wind said wire about said first pulley upon said lowering of said handle.

7. The cooking appliance of claim 1, wherein:
    said first and second heating plates have upstanding sidewalls.

8. The cooking appliance of claim 1, wherein:
    said handle is pivotally connected to said upper housing.

9. The cooking appliance of claim 1, wherein:
    said lower housing includes opposed frame members having a guide track; and
    wherein said upper housing is movable along said guide track.

10. A method for catching run off of cooking juices from a cooking appliance having an upper housing having an upper cooking plate and a lower housing having a lower cooking plate, said method comprising the steps of:
    raising said upper housing to an open position;
    providing a moving mechanism, said moving mechanism being in operative communication with said upper housing and a drip tray located in said lower housing; and
    extending said drip tray from said lower housing to a position beneath a rear edge of said upper cooking plate upon said upper housing being moved to said open position.

11. The method according to claim 10, wherein the step of raising the upper housing to said open position includes raising a handle of said cooking appliance from a lowered position to a raised position.

12. The method according to claim 10, further comprising the step of:
    lowering said upper housing to a closed position.

13. The method according to claim 12, wherein:
    said step of lowering said upper housing automatically retracts said drip tray into said lower housing.

* * * * *